United States Patent [19]

Sato

[11] 4,405,945

[45] Sep. 20, 1983

[54] SYNCHRONIZING SIGNAL DETECTOR CIRCUIT

[75] Inventor: Kenzi Sato, Fukaya, Japan

[73] Assignee: Tokyo Shibaura Denki Kabushiki Kaisha, Kawasaki, Japan

[21] Appl. No.: 350,148

[22] Filed: Feb. 19, 1982

[30] Foreign Application Priority Data

Sep. 17, 1979 [JP] Japan .................................. 54-128405

[51] Int. Cl.³ .......................... H04L 7/00; H04N 5/08; H03K 17/28
[52] U.S. Cl. ..................................... 358/154; 328/139
[58] Field of Search ............... 358/153, 154, 155, 158, 358/159; 328/139

[56] References Cited

U.S. PATENT DOCUMENTS

| | | | |
|---|---|---|---|
| 3,575,215 | 4/1971 | Boddy | 328/139 |
| 3,663,883 | 5/1972 | Olso | 328/139 |
| 3,903,356 | 9/1975 | Watatani | 358/154 |
| 3,925,613 | 12/1975 | Kokado | 358/154 |
| 3,962,540 | 6/1976 | Kokado | 328/139 |

OTHER PUBLICATIONS

A Fully Automatic Ghost Canceller, by Makino et al., Technical Research Laboratories of NHK, pp. 1 to 5.

Primary Examiner—Tommy P. Chin
Attorney, Agent, or Firm—Cushman, Darby & Cushman

[57] ABSTRACT

An AFC (auto frequency control) loop circuit is provided to generate first synchronizing pulses synchronized with horizontal synchronizing signal separated from a composite synchronizing signal. A first synchronous flip-flop connected to receive this synchronizing pulse as clock pulse and a vertical synchronizing signal separated from the composite synchronizing signal. The output of the first flip-flop is applied to an input of a second synchronous flip-flop which is connected to receive the first synchronizing pulses as clock pulses. Second synchronizing pulses are obtained by a logical product operator circuit to perform the logical product operation between an inverted output of the first flip-flop and an output of the second flip-flop. The second synchronizing pulse is produced taking the trailing edge of the vertical synchronizing signal separated from the composite synchronizing signal as a reference and thus functions as a stable vertical synchronizing signal.

3 Claims, 39 Drawing Figures

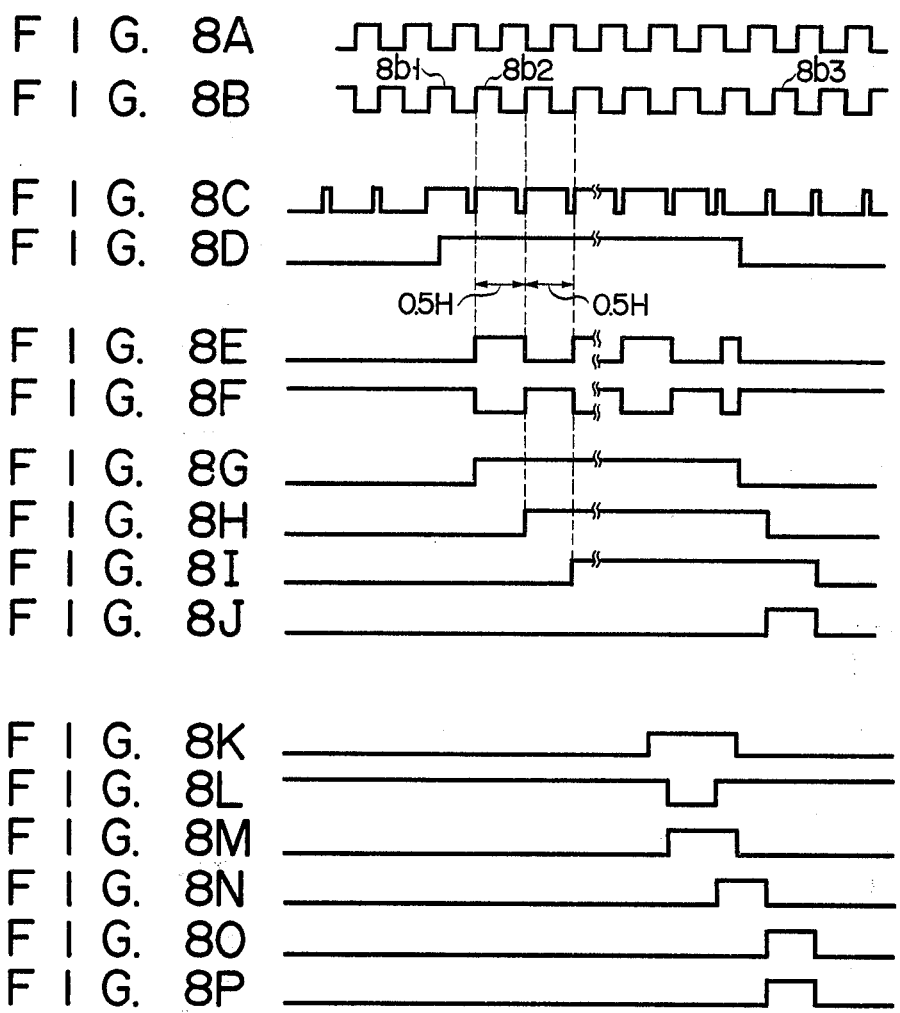

SYNCHRONIZING SIGNAL DETECTOR CIRCUIT

BACKGROUND OF THE INVENTION

The present invention relates to a synchronizing signal detector circuit and, more particularly, to a synchronizing signal detector circuit free from the influence of noise and ghost and the variation of DC level of a composite synchronizing signal when detecting a predetermined synchronizing signal in the composite synchronizing signal.

An example of signal processings responsive to a synchronizing signal extracted from a composite synchronizing signal is horizontal and vertical synchronizing process in television receivers. It is necessary, for usual treatment of a video signal, that the horizontal and vertical synchronizing of transmitted video signal is carried out. In addition to functioning as horizontal and vertical synchronizing signals, the composite synchronizing signal also functions as a time reference signal which determines the start of various signal processes. When a ghost signal is superposed on a television signal, for example, the trailing edge of a vertical synchronizing signal is used as a reference for detecting a time delay of the ghost signal relative to a main video signal. In a system in which a television receiver detects character information superposed on the vertical retrace period of television signal, the trailing edge of vertical synchronizing signal detected from composite synchronizing signal is also used to determine the start timing of extraction of character information. As described above, the composite synchronizing signal functions as a time reference signal in addition to functioning as synchronizing signals. Therefore, it is important how phase jitter due to ghost and noise can be reduced when detecting a synchronizing signal in the composite synchronizing signal.

FIG. 1 shows a conventional synchronizing signal detector circuit in television receivers. This synchronizing signal detector circuit comprises a synchronizing signal separator circuit 10 for separating vertical synchronizing signal from a composite synchronizing signal, a pulse stretcher circuit 11 for stretching the pulse width of a pulse signal obtained through synchronizing signal separator circuit 10, and a counter circuit 12 for counting predetermined clock pulses to detect the pulse width obtained through pulse stretcher circuit 11.

The operation of conventional synchronizing signal detector circuit thus arranged will be now described. The composite synchronizing signal shown in FIG. 2A at an input terminal IN of synchronizing signal separator circuit 10 is applied to the base of a transistor Tr1 through a resistor R1 and a capacitor C1. A capacitor C2 for Miller integration is connected between the base and collector of transistor Tr1 so that an integrated composite synchronizing signal shown in FIG. 2B is obtained at the collector of transistor Tr1. The signal shown in FIG. 2B is applied to the base of a transistor Tr2 which is combined with a transistor Tr3 to form a differential pair. This differential pair of transistors Tr2 and Tr3 performs switching operation at a predetermined level of the signal shown in FIG. 2B. The switching level is determined by the base potential of transistor Tr3 which depends upon the resistance value of a variable resistor RS connected across a power supply. When transistor Tr2 is switched at a voltage level shown by a broken line in FIG. 2B, a pulse shown in FIG. 2C is obtained through the collector of transistor Tr2. This pulse shown in FIG. 2C is a vertical synchronizing signal but, as shown by V1 in FIG. 2C, a split may occur at the leading portion of the vertical synchronizing signal depending on the set value of switching level of transistor Tr3.

Using the pulse thus obtained and shown in FIG. 2C, digital treatment is carried out through pulse stretcher circuit 11 and counter circuit 12 to generate a vertical synchronizing signal having a predetermined phase.

The operation of pulse stretcher circuit 11 and counter circuit 12 will now be described. Pulse stretcher circuit 11 comprises cascade-connected JK flip-flops 13, 14, 15 and 16, and the output $\overline{Q}$ of final stage JK flip-flop 16 is fed back to the JK inputs of first stage JK flip-flop 13.

An output signal (FIG. 3A) of synchronizing signal separator circuit 10 is inverted by an inverter and applied, in such a form as shown in FIG. 3B, to the input terminal 11a of pulse stretcher circuit 11. Since JK flip-flops operate in negative logic, they are under reset condition during the time period when the pulse shown in FIG. 3B is low. When the period of low level shown in FIG. 3B has finished and the pulse then goes high, JK flip-flops are released from the reset condition. When JK flip-flops are released from the reset condition, they count clock pulses of a frequency sixty-four times the frequency fH of horizontal synchronizing signal which are applied to the input terminal of first stage JK flip-flop 13. Output waveforms of JK flip-flops 13, 14 and 15 are shown in FIGS. 3D, 3E and 3F respectively. As a result of this counting operation, when the output Q (FIG. 3G) of fourth stage JK flip-flop 16 goes high, the output $\overline{Q}$ (FIG. 3H) of JK flip-flop 16 coupled to the inputs of flip-flop 13 becomes low. As the result, the operation of counting clock pulses applied to pulse stretcher circuit 11 is stopped and the pulse shown in FIG. 3H is obtained through the output $\overline{Q}$ of JK flip-flop 16. As apparent from the above, pulse stretcher circuit 11 stretches the pulse width of pulse (FIG. 3B) by a period of time during which JK flip-flops 13 to 16 count clock pulses by a predetermined value starting from the trailing edge of pulse. This pulse (FIG. 3B) stretching period is about 8 μsec since the frequency of clock pulses is made sixty-four times the frequency (15.75 kHz) of horizontal synchronizing signal. Therefore, the pulse stretching circuit stretches the pulse width of inverted pulse of output pulse of synchronizing signal separator circuit 10 for about 8 μsec.

The counter circuit 12 comprises cascade-connected JK flip-flops 17, 18, 19 and 20. Each of JK flip-flops is reset by a signal which is the inverse of the output signal of the output $\overline{Q}$ of final stage JK flip-flop 16 in pulse stretcher circuit 11. Namely, each of JK flip-flops 17, 18, 19 and 20 is kept released from its reset condition during the period that the output $\overline{Q}$ of JK flip-flop 16 shown in FIG. 3H is high. During this period the counter circuit 12 counts clock pulses α applied to the first stage JK flip-flop 17. It is detected by counting clock pulses α by a predetermined value that an incoming pulse is a vertical synchronizing signal. A pulse which serves as a phase reference of the vertical synchronizing signal is generated by a pulse generator circuit (not shown) responsive to this detection.

Namely, the conventional synchronizing signal detector circuit stretches for about 8 μsec the pulse width of a vertical synchronizing signal separated by synchronizing signal separator circuit 10 to thereby fill the split portion caused by noise in the vertical synchronizing signal. The counter circuit 12 starts to count clock pulses α starting from the leading edge of vertical synchronizing signal in which the influence due to noise is reduced. When the counter counts clock pulses α by the predetermined value at this time, the incoming pulse is detected to be a vertical synchronizing signal. The pulse which serves as the reference phase of the vertical synchronizing signal is generated through the pulse generator circuit (not shown) responsive to output of counter circuit 12, thus allowing a synchronizing signal to be extracted.

However, the conventional synchronizing signal detector circuit has following drawbacks.

A synchronizing signal extracted from the composite synchronizing signal is used as a synchronizing signal by which signal treatment is performed synchronizing with a transmitted signal, and also as a reference time signal by which various signal treatments are performed. It is therefore desirable that the synchronizing signal is stable both in frequency and phase. In the case where a vertical synchronizing signal is extracted from the composite synchronizing signal of a television signal for achieving vertical synchronization or generating a reference time to extract character information inserted in the vertical retrace period, it is necessary to consider the influence due to noise and ghost signal. When a negative ghost is superposed on a television signal, the synchronizing signal portion comes to have a stepped waveform as shown in FIG. 4A. The DC level of synchronizing signal portion also varies this time and the vertical synchronizing signal is separated at a DC level different from that set by the variable resistor in synchronizing signal separator circuit 10. Therefore, the output of synchronizing signal separator circuit 10 has splits at the leading edge portion of pulse as shown in FIG. 4B. If the period of this split portion lasts about 8 μsec, this split portion cannot be filled by pulse stretcher circuit 11. Therefore, the counter circuit 12 starts to count clock pulses α not starting from the leading edge of pulse separated through synchronizing signal separator circuit 10 but from the trailing edge of split portion. This causes counter circuit 12 to perform such a malfunction that a vertical synchronizing signal cannot be detected.

When noise is mixed in the vertical synchronizing signal portion as shown in FIG. 4C, the output signal of synchronizing signal separator circuit 10 has, at the leading edge portion thereof, split portions caused by the influence of noise as shown in FIG. 4D. Similarly to the case where ghost signal is superposed, correct vertical synchronizing signal cannot be extracted due to the malfunction of counter circuit 12 relating to its counting start.

As described above, the conventional synchronizing signal detector circuit causes malfunction when a ghost signal is superposed on the main signal or noise is mixed in it. This is because a synchronizing signal is detected using its leading edge portion as a reference notwithstanding its leading edge portion is more easily influenced by ghost signal and noise than its trailing edge portion.

SUMMARY OF THE INVENTION

An object of the present invention is therefore to provide a synchronizing signal detector circuit capable of stably and correctly detecting a vertical synchronizing signal in a composite synchronizing signal even if noise and ghost signal are present in a television signal.

According to the present invention, a synchronizing signal detector circuit comprises a first synchronizing signal separator circuit for separating a first synchronizing signal from a composite synchronizing signal in which first and second synchronizing signals are includes; a second synchronizing signal separator circuit for separating the second synchronizing signal from the composite synchronizing signal, an AFC loop circuit for generating therein a signal which is synchronized in phase with the first synchronizing signal; a first synchronous flip-flop which receives, as a clock pulse, the signal generated by the AFC loop and synchronized in phase with the first synchronizing signal and the second synchronizing signal as an input; a second synchronous flip-flop which receives, as an input, the output of the first synchronizing flip-flop and operates in synchronism with the clock pulse; and a logical product operation circuit for effecting a logical product operation between outputs of the first and second flip-flops.

BRIEF DESCRIPTION OF THE DRAWINGS

FIGS. 8A to 8P are waveform diagrams used to explain the operation of synchronizing signal detector circuit of FIG. 7.

DETAILED DESCRIPTION OF THE PREFERRED EMBODIMENTS

Figure 5:
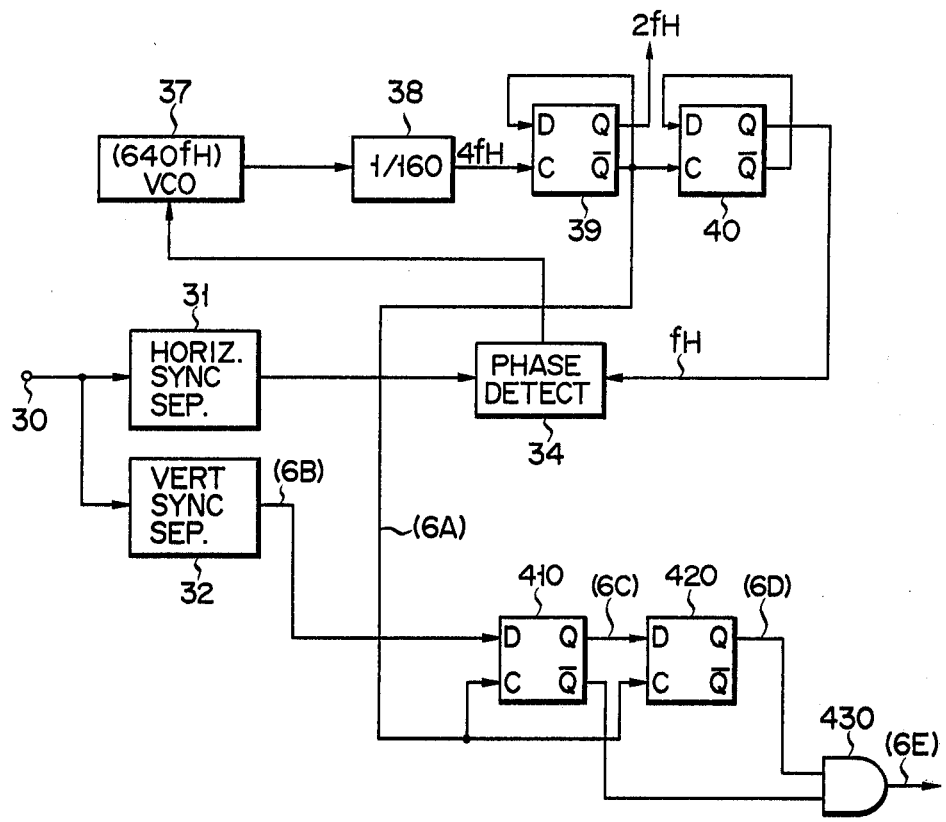
FIG. 5 shows a synchronizing signal detector circuit according to an embodiment of the present invention.

FIG. 5 is a block diagram of a synchronizing signal detector circuit of the present invention which may be used in television receivers. Clock pulses for operating D-type flip-flops to detect a synchronizing signal are obtained by an AFT (Auto Fine Tuning) loop circuit which serves to generate signals synchronized in phase with horizontal synchronizing signal. It should be noted that a vertical synchronizing signal is detected using its trailing edge portion as a reference.

The operation of synchronizing signal detector circuit of FIG. 5 will now be described. A composite synchronizing signal is applied to a terminal 30. The composite synchronizing signal is separated into horizontal and vertical sync pulses by a horizontal sync separator circuit 31 and a vertical sync separator circuit 32 having the same arrangement as separator 10 of FIG. 1.

Horizontal synchronizing signal separated by horizontal sync separator circuit 31 is supplied to an input terminal of a phase detector circuit 34. Output of phase detector 34 is supplied to a control terminal of a voltage-controlled oscillator (VCO) 37 which oscillates at a frequency of 640fH 640 times the frequency fH of horizontal synchronizing signal. Output of VCO 37 whose oscillating frequency is controlled by the output of phase detector 34 is divided by a frequency divider 38 by a factor of 160. Output of this divider 38, that is, a signal having a frequency 4fH is used as input clock pulses of a D-type flip-flop 39. Signal of 2fH is thus obtained at the output $\bar{Q}$ of D-type flip-flop 39. A D-type flip-flop 40 cascade-connected to D-type flip-flop 39 divides the signal of 2fH by a factor of two to produce a signal of fH at the output thereof. The output of D-type flip-flop 40 is applied to the other input terminal of phase detector 34.

The phase detector 34 compares in phase the horizontal synchronizing signal separated from the composite synchronizing signal with the output signal of D-type flip-flop 40, and controls VCO 37 by a voltage corresponding to this phase comparison result. In other words, phase detector 34, VCO 37, divider 38 and D-type flip-flops 39, 40 form AFC loop. As a result, the output signals of 2fH and fH synchronized in phase with horizontal synchronizing signal are obtained at the outputs of D-type flip-flops 39 and 40.

The signal of 2fH thus obtained from the output of D-type flip-flop 39 in the AFC loop and synchronized in phase with horizontal synchronizing signal is used as clock pulses of D-type flip-flop 410 and 420 which will be described later and which are employed to detect vertical synchronizing signal.

The D-type flip-flop 410 receives an output signal of vertical sync separator circuit 32 as an input signal. The D-type flip-flop 420 receives the output Q of D-type flip-flop 410 as input and the output terminal Q of D-type flip-flop 420 is connected to an input terminal of an AND gate 430. The output $\bar{Q}$ of D-type flip-flop 410 is connected to the other input terminal of AND gate 430 and a vertical synchronizing signal having reference phase information is obtained through AND gate 430.

The operation of vertical synchronizing signal detector circuit having such an arrangement as described above will now be described.

The horizontal synchronizing signal in the composite synchronizing signal applied to terminal 30 is separated by horizontal synchronizing signal separator circuit 31. Phase comparison between this separated horizontal synchronizing signal and the output of D-type flip-flop 40, which divides oscillating output of VCO 37 to generate the output signal of horizontal frequency fH, is carried out through phase detector 34. Output of phase detector 34 corresponding to the result of phase comparison controls VCO 37, whereby outputs of D-type flip-flops 39 and 40 are synchronized in phase due to AFC operation with the horizontal synchronizing signal separated from the composite synchronizing signal. Output of D-type flip-flop 39 or 40 synchronized in phase with horizontal synchronizing signal due to AFC operation is used as clock pulses of D-type flip-flops 410 and 420 which operate to detect a vertical synchronizing signal.

It should be noted that both of D-type flip-flops 410 and 420 are essentially different from each other in function although any of them contributes to the extraction of a vertical synchronizing signal having phase reference information. Namely, the preceding D-type flip-flop 410 contributes to the suppression of influence of noise and ghost in the separated vertical synchronizing signal while the succeeding D-type flip-flop 420 operates together with D-type flip-flop 410 to produce a vertical reference pulse at a certain position. This will be described referring to waveform diagrams shown in FIG. 6.

Figure 6A:
FIGS. 6A to 6E are waveform diagrams used to explain the operation of synchronizing signal detector circuit of FIG. 5.
Figure 6B:

FIG. 6A shows the signal of 2fH obtained at the output $\bar{Q}$ of D-type flip-flop 39 in the AFC loop, that is, clock pulses synchronized in phase with horizontal synchronizing signal and applied to D-type flip-flops 410 and 420.

Figure 6C:

The D-type flip-flop 410 will be described at first. The vertical synchronizing signal (FIG. 6B) separated by vertical sync separator circuit 32 is applied to an input terminal D of D-type flip-flop 410. The vertical synchronizing signal is detected by D-type flip-flop 410 responsive to clock pulse (FIG. 6A) obtained through the output of D-type flip-flop 39 in the AFC loop. Namely, if the vertical synchronizing signal inputted to terminal D is high when clock pulse goes high, it is detected as the rising portion of vertical synchronizing signal, while if the vertical synchronizing signal is low when clock pulse goes high, it is detected as the falling portion of vertical synchronizing signal. The level of output terminal Q of flip-flop 410 becomes high after the lapse of one clock pulse period starting from the rising of vertical synchronizing signal as shown in FIG. 6C. In other words, during the period that the rising and the falling of the vertical synchronizing signal (FIG. 6B) are detected and clock pulses are counted by one, D-type flip-flop 410 delays the vertical synchronizing signal by one clock pulse period without being influenced by noise in the vertical synchronizing signal. Namely, the leading edge portion of vertical synchronizing signal (FIG. 6B) is liable to vary in DC level or to be influenced by noise when vertical synchronizing signal is separted by the vertical synchronizing separator circuit 32, but the influence of these factors is suppressed during the period that D-type flip-flop 410 counts clock pulses by one after it detects the rising and the falling of vertical synchronizing signal. Since the frequency of clock pulses is set two times the frequency of horizontal synchronizing signal, that is, to be 2fH in the embodiment, effect to suppress noise can be achieved during 0.5H (H: one horizontal period) of leading edge portion of the vertical synchronizing signal after the rising of vertical synchronizing signal. This noise suppressing period starting from the rising of vertical synchronizing signal depends upon the frequency of clock pulses. Therefore, the noise suppressing period is controlled by varying the frequency of clock pulses applied to the D-type flip-flop. The signal Q obtained by shifting the phase of vertical synchronizing signal by one clock pulse through D-type flip-flop 410 is applied to a terminal D of D-type flip-flop 420.

Figure 6D:
Figure 6E:

The D-type flip-flop 420 contributes together with D-type flip-flop 410 to the phase detection of falling portion of a signal (FIG. 6C) corresponding to the vertical synchronizing signal. The signal (FIG. 6C) obtained through the output Q of D-type flip-flop 410 is applied to D-type flip-flop 420 where it is shifted by one clock pulse period as shown in FIG. 6D. A logical product operation between the outputs Q and $\bar{Q}$ of D-type flip-flops 420 and 410 is carried out by AND gate 430. As a result, a phase reference signal (FIG. 6E) of the vertical synchronizing signal is obtained through the output of AND gate 430. The reason why the output of AND gate 430 is used as the reference phase of the vertical synchronizing signal is that the phase of falling of the output of flip-flop 410 does not change even if the phase of falling of the vertical synchronizing signal separated by vertical synchronizing separator circuit 32 varies during the one cycle period (0.5H) of clock pulses. In other words, the phase of trailing edge of output Q of D-type flip-flop 410 does not change even if the phase of separated vertical synchronizing signal (FIG. 6C) shows phase jitter within one cycle period (0.5H) of clock pulses. Since the phase of output of D-type flip-flop 410 is stable even if phase jitter is caused at the trailing edge of the separated vertical synchronizing signal, the phase of output Q of D-type flip-flop 420, which is obtained by delaying the output Q (FIG. 6C) of D-type flip-flop 410 by one clock pulse period, also becomes stable. Therefore, the phase of the output of AND gate 430 for carrying out logical product operation between the outputs Q and Q̄ of D-type flip-flops 420 and 410 also becomes stable.

As described above, this embodiment allows the influence of noise to be suppressed at the leading edge of the vertical synchronizing signal by providing a noise-insensitive period of 0.5H at the leading edge of the separated vertical synchronizing signal by D-type flip-flop 410. In addition, the phase of output of AND gate 430 becomes stable since the trailing edge of the separated vertical synchronizing signal which is difficultly influenced by noise is used as the reference phase of the vertical synchronizing signal. Even if the DC level of composite synchronizing signal varies because of ghost signal superposed, the influence is more reduced at the trailing edge of separated vertical synchronizing signal as compared with the leading edge thereof. This also teaches that the phase of reference phase signal (FIG. 6E) formed using the trailing edge of vertical synchronizing signal is stable. As described above, this embodiment in which the leading edge of separated vertical synchronizing signal (FIG. 6E) is only detected and the trailing edge thereof is used as a phase reference allows the stable reference phase of vertical synchronizing signal to be obtained, whereby the output signal (FIG. 6E) of AND gate 430 can be used as a reference time signal for processing character information superposed during the vertical retrace period as well as vertical synchronizing signal.

The D-type flip-flop 410 is employed in this embodiment as a means to suppress the phase change due to ghost signal and the influence due to noise at the leading edge of vertical synchronizing signal, and this embodiment discloses the synchronizing signal detector circuit for extracting a vertical synchronizing signal having phase reference information based on a signal in which the influence of noise and the like is suppressed.

When a television broadcasting is received, composite synchronizing signal is changed in phase because of ghost and noise. When this phase change is caused, reference phase information of vertical synchronizing signal is lost. In order to overcome this problem, the above-described embodiment employs the D-type flip-flops as means to suppress the influence due to the phase change of vertical synchronizing signal, but another means will now be described.

Figure 7:
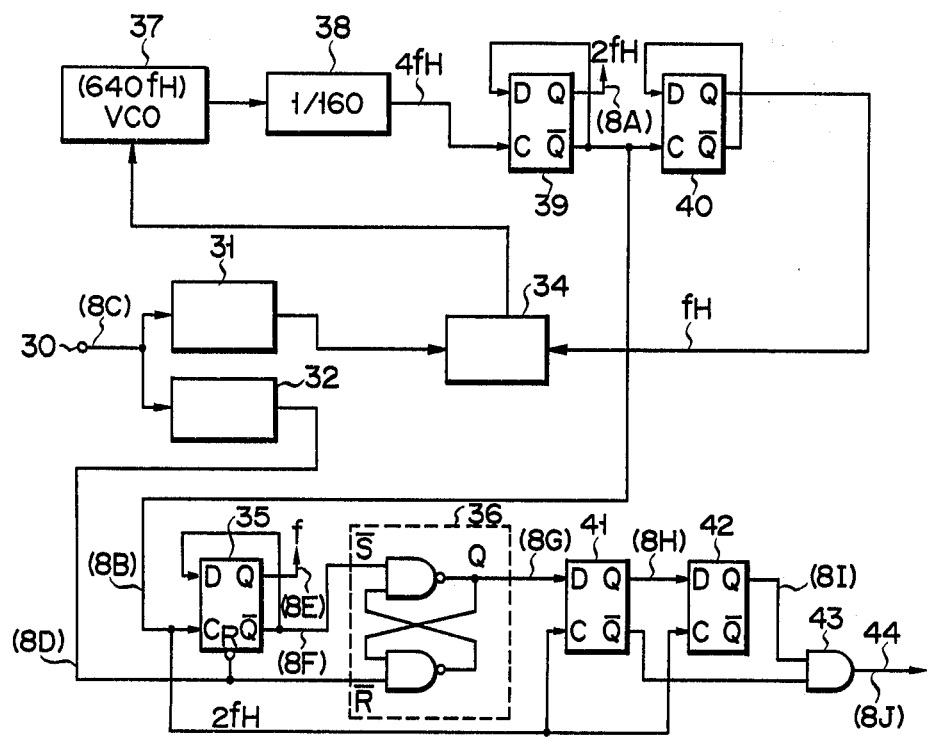
FIG. 7 shows a synchronizing signal detector circuit according to another embodiment of the present invention.

FIG. 7 shows another example of synchronizing signal detector circuit according to the present invention and employed in the television receiver. Same parts as those in the synchronizing signal detector circuit shown in FIG. 5 will be represented by the same reference characters and description on these parts will be omitted.

The synchronizing signal detector circuit shown in FIG. 7 is characterized in that a D-type flip-flop 35 having a reset terminal, and an RS flip-flop 36 are added to the circuit shown in FIG. 5. This second embodiment is similar to the first embodiment in that the detection of a predetermined period is carried out starting from the leading edge of vertical synchronizing signal but different in that the trailing edge of vertical synchronizing signal is more reliably detected. Namely, the feature of this second embodiment resides in that RS flip-flop 36 is brought into the set condition between leading and trailing edges of the vertical synchronizing signal and that the set condition of RS flip-flop 36 is controlled by D-type flip-flop 35. This allows the phase change of vertical synchronizing signal due to ghost or noise to be suppressed. The operation of synchronizing signal detector circuit shown in FIG. 7 will now be described.

Figure 1:
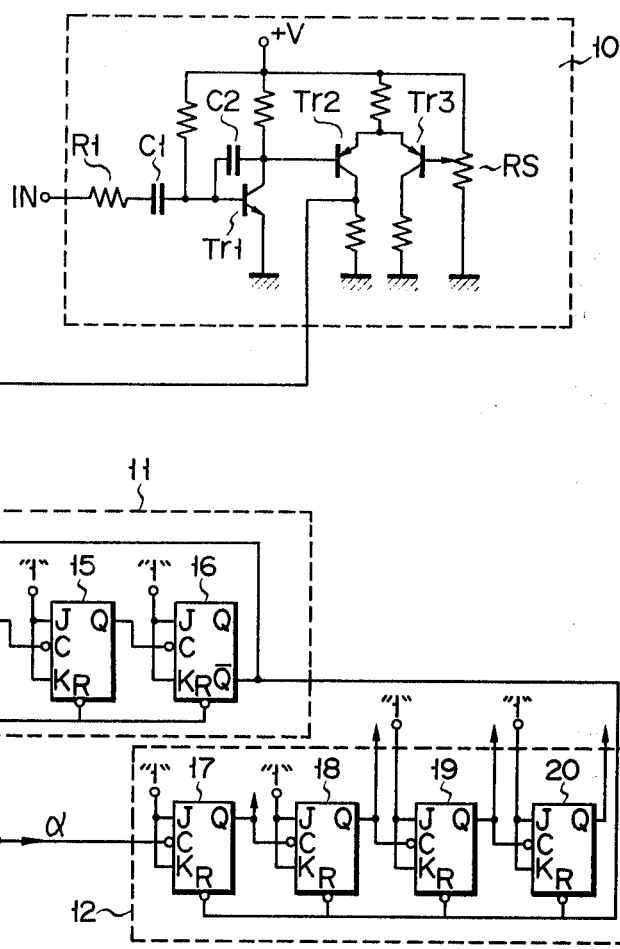
FIG. 1 shows a conventional synchronizing signal detector circuit.

Composite synchronizing signal (FIG. 8C) inputted to input terminal 30 is separated by horizontal sync separator circuit 31 and vertical sync separator circuit 32 to horizontal and vertical synchronizing signals, respectively. Horizontal synchronizing signal separated by horizontal sync separator circuit 31 is compared in phase with the output of D-type flip-flop 40 in the AFC loop by means of phase detector 34. Responsive to the output of this phase detector 34, VCO 37 is controlled to perform AFC operation. A signal in the AFC loop synchronized in phase, thanks to the AFC operation, with horizontal synchronizing signal separated by horizontal sync separator circuit 31 is used as clock pulses applied to D-type flip-flops 35, 41 and 42. In the case of this second embodiment, a signal (FIG. 8B) of 2fH (two times the frequency of horizontal synchronizing signal) obtained at the terminal Q of D-type flip-flop 39 in the AFC loop is used as clock pulses applied to D-type flip-flops 35, 41 and 42. Vertical synchronizing signal separated by vertical sync separator circuit 32 similar to that shown in FIG. 1 is supplied to the reset terminal of D-type flip-flop 35 and the reset terminal R̄ of synchronous RS flip-flop 36. The output Q of RS flip-flop 36 is connected to the terminal D of D-type flip-flop 41, whose output Q is connected to the terminal D of D-type flip-flop 42. Output terminals Q̄ and Q of D-type flip-flops 41 and 42 are connected to AND gate 43.

The operation of vertical synchronizing signal detector circuit thus arranged will be described. The signal (FIG. 8D) separated by vertical sync separator circuit 32 is applied to the reset terminal R of D-type flip-flop 35 and the reset terminal R̄ of RS flip-flop 36. D-type flip-flop 35 is reset during the period that the vertical synchronizing signal (FIG. 8D) is low. Therefore, D-type flip-flop 35 is reset during the period that vertical synchronizing signal (FIG. 8D) is low, that is, during the period except the period of vertical synchronizing signal and the output Q (FIG. 8E) thereof is low while the output Q̄ thereof is high, whereby noise present during the period except the period of vertical synchronizing signal is suppressed. This means that an undesired set signal is prevented from being applied to the set terminal S̄ of RS flip-flop 36 during the period except the periiod of vertical synchronizing signal so that the influence of noise is suppressed.

D-type flip-flop 35 receives output Q̄ (FIG. 8B) of D-type flip-flop 39 in the AFC loop as clock pulses and functions to generate a set pulse applied to RS flip-flop 36. RS flip-flop 36 is set when the set terminal S thereof is at low level, and the noise suppressing operation is achieved at the leading edge of vertical synchronizing signal in the course of this set operation. This is because D-type flip-flop 35 counts clock pulses (FIG. 8B) starting from the leading edge of vertical synchronizing signal only during the period of vertical synchronizing signal.

Namely, D-type flip-flop 35 practically counts clock pulses of 2fH in the AFC loop during the period of vertical synchronizing signal. As the result of this counting operation, the output Q of D-type flip-flop 35 becomes equal to the ½-divided of clock pulse (FIG. 8B) only during the period of vertical synchronizing signal, as shown in FIG. 8F. It should be noted that D-type flip-flop 35 is of synchronous type while RS flip-flop 36 is of non-synchronous type.

Namely, D-type flip-flop 35 which receives the signal (FIG. 8B) in the AFC loop as clock pulses starts its counting operation not responsive to a clock pulse (FIG. 8B) but responsive to a next clock pulse (8$b$2) of clock pulses (FIG. 8B) relating to the leading edge of vertical synchronizing signal (FIG. 8D), whereby the leading edge of the vertical synchronizing signal (FIG. 8D) is detected through D-type flip-flop 35 at the leading edge of clock pulse (8$b$2). This means that D-type flip-flop 35 functions to take a certain phase of the leading edge of clock pulse (8$b$2) for the phase of the leading edge of vertical synchronizing signal even if phase change is caused at the leading edge of vertical synchronizing signal over the period (or one horizontal period in this embodiment) from the rising of clock pulse (8$b$1) to the falling of clock pulse (8$b$2). In other words, even if phase jitter is caused because of ghost phenomenon and the like at the leading edge of vertical synchronizing signal (FIG. 8D) between the rising of clock pulse (8$b$1) and the falling of clock pulse (8$b$2), the influence of these factors is prevented by the function of D-type flip-flop 35.

The influence of phase jitter caused at the leading edge of vertical synchronizing signal can be thus prevented, but the suppression of influence due to phase jitter caused at the trailing edge of vertical synchronizing signal is related to RS flip-flop 36.

As described above, RS flip-flop 36 is released from reset condition over the period from the leading edge to the trailing edge of vertical synchronizing signal (FIG. 8D). Therefore, when the signal obtained by ½-dividing the clock pulse (FIG. 8B) is generated at the output Q of D-type flip-flop 35 at the phase (8$b$2) of clock pulses (FIG. 8B), set input is applied to one input terminal S of flip-flop 36. The set condition of RS flip-flop 36 continues until the trailing edge of vertical synchronizing signal (FIG. 8D) becomes low and the set condition of RS flip-flop 36 itself is released. Namely, the ½-dividing operation of D-type flip-flop 36 relative to clock pulses during the periiod of vertical synchronizing signal is stopped at the same time when falling signal of trailing edge of vertical synchronizing signal is applied to the reset terminal R of D-type flip-flop 36. In this case, since D-type flip-flop 35 is of synchronous type, the ½-dividing operation stops at the trailing edge of vertical synchronizing signal and synchronizing with clock pulse (FIG. 8D). Since D-type flip-flop 35 is of synchronous type as described above, the influence of phase jitter corresponding to one clock is suppressed even at the trailing edge similarly to that at the leading edge of vertical synchronizing signal. As clock pulse is set to have a frequency of 2fH in this second embodiment, the tolerance of phase jitter caused by ghost phenomenon and the like at the trailing edge of vertical synchronizing signal is one horizontal period the same as the leading edge thereof.

Pulse having a certain phase shown in FIG. 8G can be thus obtained through the output of RS flip-flop 36 even if phase jitter is caused at the leading or trailing edge of vertical synchronizing signal (FIG. 8D) over one horizontal period.

The signal obtained at the output Q of RS flip-flop 36 is applied to the input terminal D of D-type flip-flop 41. The signal (FIG. 8H) obtained at the output terminal Q of D-type flip-flop 41 is applied to the input terminal D of D-type flip-flop 42. Both of D-type flip-flops 41 and 42 receive the signal 2fH in the AFC loop and are of synchronous type. D-type flip-flop 41 serves to suppress phase change at the rising and the falling of output of RS flip-flop 36 shown in FIG. 8G. D-type flip-flop 42 co-operates with D-type flip-flop 41 to delay by one clock pulse period the phase of output (FIG. 8H) of D-type flip-flop 41, and generates the signal (FIG. 8I). Logical product operation between the output signal at the output Q of D-type flip-flop 41 and the signal (FIG. 8I) at the output terminal Q of D-type flip-flop 42 is carried out through the AND gate 43. As the result of this logical product operation, stable reference phase signal free from the influence of phase jitter caused by ghost phenomonon and the like is obtained at the output terminal 44 of AND gate 43.

As described above, this second embodiment allows the phase of output terminal 44 of AND gate 43 not to be varied and stable reference phase signal to be extracted at the trailing edge of vertical synchronizing signal even if phase change is caused because of ghost phenomenon.

There will now be described a case where the influence of ghost phenomenon is worst in the synchronizing signal detector circuit of FIG. 7.

Figure 2A:
FIGS. 2A to 2C are waveforms used to explain the operation of an analog synchronizing signal separator circuit 10 shown in FIG. 1.
Figure 2B:
Figure 2C:
Figure 3A:
FIGS. 3A to 3H are waveform diagrams used to explain the operation of a pulse stretcher circuit 11 shown in FIG. 1.
Figure 3B:
Figure 3C:
Figure 3D:
Figure 3E:
Figure 3F:
Figure 3G:
Figure 3H:
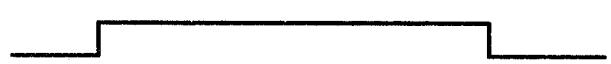
Figure 4A:
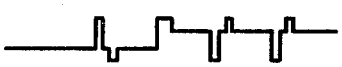
FIGS. 4A to 4D are waveform diagrams showing input and output signals of synchronizing signal separator circuit 10 shown in FIG. 1 in the case where ghost or noise is involved.
Figure 4B:
Figure 4C:
Figure 4D:
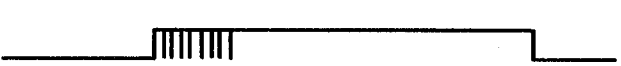

Let us consider a case where an extremely large negative ghost signal is superposed on the composite synchronizing signal. The DC level of vertical synchronizing signal separated by vertical sync separator circuit 32 is lowered because of negative ghost signal. This means that the DC level of composite synchronizing signal is lowered at input terminal IN as compared with the DC level set by variable resistor RS in the vertical sync separator circuit 32 shown in FIG. 5 while the DC level of integrated waveform of composite synchronizing signal shown in FIG. 2B is raised. Therefore, the pulse width of vertical synchronizing signal separated by vertical sync separator circuit 32 shown in FIG. 7 becomes narrow extremely (FIG. 8K). Even if the pulse width becomes narrow like this because of ghost phenomenon, RS flip-flop 36 can be brought into set condition, providing that ½ dividing operation of clock pulse (FIG. 8B) is effected at least one time by D-type flip-flop 35 to generate a pulse shown in FIG. 8L. When this D-type flip-flop 35 is set, RS flip-flop 36 is reset at the trailing edge of vertical synchronizing signal (FIG. 8K) so that a signal shown in FIG. 8M is obtained at the output terminal Q thereof. And signals (FIGS. 8N and 8Q) are obtained at output terminals Q of D-type flip-flops 41 and 42, respectively. As the result, reference phase signal (FIG. 8P) is obtained at output terminal 44 of AND gate 43.

If the vertical synchronizing signal is present at least for one horizontal period even in the worst case caused by ghost phenomenon, therefore, a reference phase signal can be obtained as a vertical synchronizing signal in the embodiment shown in FIG. 7. Since determined by the pulse width of clock pulses, the minimum pulse width of pulses separated as vertical synchronizing signal to generate reference phase signal from vertical synchronizing signal can be controlled by controlling the frequency of clock pulses. It is preferable even in this case that stable signal in the AFC loop is used as clock pulses.

Since the synchronizing signal detector circuit according to the present invention allows stable phase reference signal to be provided using the trailing edge of synchronizing signal as the reference, as described above, the phase reference signal functions as a reference time signal as well as a synchronizing signal. When the synchronizing signal detector circuit according to the present invention is employed in television receivers, therefore, the influence of phase jitter caused by ghost phenomenon is suppressed to thereby make the synchronization stable. In addition, the phase reference signal can be used as a time reference signal for treating character information in the system in which character information is superposed during the vertical retrace period. Further, the phase reference signal can also be used as a time reference signal to detect a time difference between a main video signal and a ghost signal to remove ghost. The synchronizing signal detector circuit according to the present invention can be employed in any of devices such as magnetic recording and reproducing devices which require synchronizing operation as well as in television receivers.

What is claimed is:

1. A synchronizing signal detector circuit comprising:
   a first synchronizing signal separator circuit for separating aifrst synchronizing signal from a composite synchronizing signal in which first and second synchronizing signals are included;
   a second synchronizing signal separator circuit for separating the second synchronizing signal from the composite synchronizing signal;
   an AFC loop for generating therein a signal synchronized in phase with the first synchronizing signal;
   a first synchronous flip-flop which receives, as a clock pulse, the signal generated by said AFC loop and synchronized with the first synchronizing signal, and, as an input, the second synchronizing signal;
   a second synchronous flip-flop which receives, as an input, the output of said first flip-flop, and operates in synchronism with the clock pulse; and
   a logical product operation circuit for performing a logical product operation between outputs of said first and second flip-flops.

2. A synchronizing signal detector circuit comprising:
   a first synchronizing signal separator circuit for separating a first synchronizing signal from a composite synchronizing signal in which first and second synchronizing signals are included;
   a second synchronizing signal separator circuit for separating a second synchronizing signal from the composite synchronizing signal;
   first delay means for delaying the second synchronizing signal in accordance with a predetermined clock pulse;
   second delay means for delaying an output signal of said first delay means by one clock cycle responsive to the clock pulse; and
   means for generating a reference phase signal at the trailing edge of the second synchronizing signal in response to outputs of said first and second delay means.

3. A synchronizing signal detector circuit comprising:
   a first synchronizing signal separator circuit for separating a first synchronizing signal from a composite synchronizing signal in which first and second synchronizing signals are included;
   a second synchronizing signal separator circuit for separating the second synchronizing signal from the composite synchronizing signal;
   an AFC loop for generating therein a signal synchronized in phase with the first synchronizing signal;
   frequency divider means connected to receive the second synchronizing signal as a reset releasing signal and the signal obtained by said AFC loop as a clock pulse for frequency dividing the clock pulse;
   a flip-flop connected to receive an output signal of said divider means as a set input and the second synchronizing signal as a reset signal;
   first delay means for delaying an output signal of said flip-flop in synchronism with the clock pulse;
   second delay means for delaying an output signal of said first delay means in synchronism with the clock pulse; and
   means for generating a reference phase signal at the trailing edge of the second synchronizing signal in response to outputs of said first and second delay means.

* * * * *